United States Patent
Motegi

(10) Patent No.: US 9,225,857 B2
(45) Date of Patent: Dec. 29, 2015

(54) DIGITAL SIGNAGE DISPLAY SYSTEM

(71) Applicant: Atsushi Motegi, San Jose, CA (US)

(72) Inventor: Atsushi Motegi, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 14/194,308

(22) Filed: Feb. 28, 2014

(65) Prior Publication Data

US 2015/0249756 A1  Sep. 3, 2015

(51) Int. Cl.
- *H04N 1/00* (2006.01)
- *G06F 3/12* (2006.01)
- *H04N 1/32* (2006.01)
- *G06Q 10/00* (2012.01)
- *G06Q 30/02* (2012.01)

(52) U.S. Cl.
CPC .......... *H04N 1/00244* (2013.01); *G06F 3/1285* (2013.01); *G06Q 10/20* (2013.01); *G06Q 30/0207* (2013.01); *G06Q 30/0241* (2013.01); *H04N 1/00408* (2013.01); *H04N 1/00464* (2013.01); *H04N 1/32117* (2013.01)

(58) Field of Classification Search
None
See application file for complete search history.

(56) References Cited

U.S. PATENT DOCUMENTS

| | | | |
|---|---|---|---|
| 2004/0117258 A1* | 6/2004 | Kanbara | 705/14 |
| 2009/0006214 A1 | 1/2009 | Lerman et al. | |
| 2010/0067039 A1 | 3/2010 | Williams | |
| 2010/0241444 A1 | 9/2010 | Young | |
| 2011/0213662 A1 | 9/2011 | Jessen et al. | |
| 2013/0080221 A1* | 3/2013 | Lin et al. | 705/14.4 |
| 2013/0141441 A1* | 6/2013 | Shimizu | 345/501 |

OTHER PUBLICATIONS

European Patent Office, "Search Report" in application No. 15156334.3-1955, dated Jul. 7, 2015, 8 pages.

* cited by examiner

*Primary Examiner* — Thomas D Lee
(74) *Attorney, Agent, or Firm* — Hickman Palermo Becker Bingham LLP

(57) ABSTRACT

A printing device is configured to display digital signage items on a display screen of the printing device. The printing device sends a request to a digital signage server for digital signage items for display. The request includes a device identifier that identifies the printing device. Based on the device identifier, the digital signage server selects particular digital signage items for display on the particular printing device. For example, the digital signage server may select particular digital signage items based on stored information about the particular printing device including a geographical location of the printing device, information about users of the printing device, information about previous user interactions with displayed digital signage items, etc. The printing device may also be configured to enable users to interact with displayed digital signage items such as by sending a message, printing a coupon, or viewing a product website.

18 Claims, 8 Drawing Sheets

DIGITAL SIGNAGE DISPLAY SYSTEM

FIELD

Embodiments relate generally to a system for displaying digital signage on printing devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Printing devices are a common fixture in many office environments. Current printing devices typically provide some combination of print, fax, copy, and other functionality that can be accessed via an operation panel on the printing device. One type of operation panel includes a digital display screen that is capable of generating graphical user interfaces and other visual displays related to the operation of the printing device. For example, a typical operation panel display screen may be configured to display a graphical user interface that includes buttons and other interface elements that enable users to operate the printing device.

While operation panels including digital display screens are useful for facilitating user operation of a printing device, there are instances where a printing device display screen may be underutilized. As one example, a printing device having a digital display screen commonly may be configured to turn off the display screen in response to detecting that the printing device has not been in use for an extended period of time. In some environments, turning off a display screen when a printing device is idle may be useful for energy saving purposes. However, in other environments this screen time may represent a valuable opportunity for an owner or operator of a printing device to display additional information, particularly in environments where an owner or operator of the printing device allows use of the printing device by others on a rental basis.

SUMMARY

A printing device comprises one or more processors; a user interface configured to receive user input and display information; and one or more memories storing instructions which, when processed by the one or more processors, cause sending, to a digital signage server, a request for one or more digital signage items to be displayed on the printing device, wherein the request includes a device identifier; receiving, from the digital signage server, particular digital signage data for one or more particular digital signage items to be displayed on the printing device; displaying, on the user interface, based at least in part on the particular digital signage data for the one or more particular digital signage items to be displayed on the printing device, at least one particular digital signage item from the one more particular digital signage items.

BRIEF DESCRIPTION OF THE DRAWINGS

In the figures of the accompanying drawings like reference numerals refer to similar elements.

DETAILED DESCRIPTION

Figure 1:
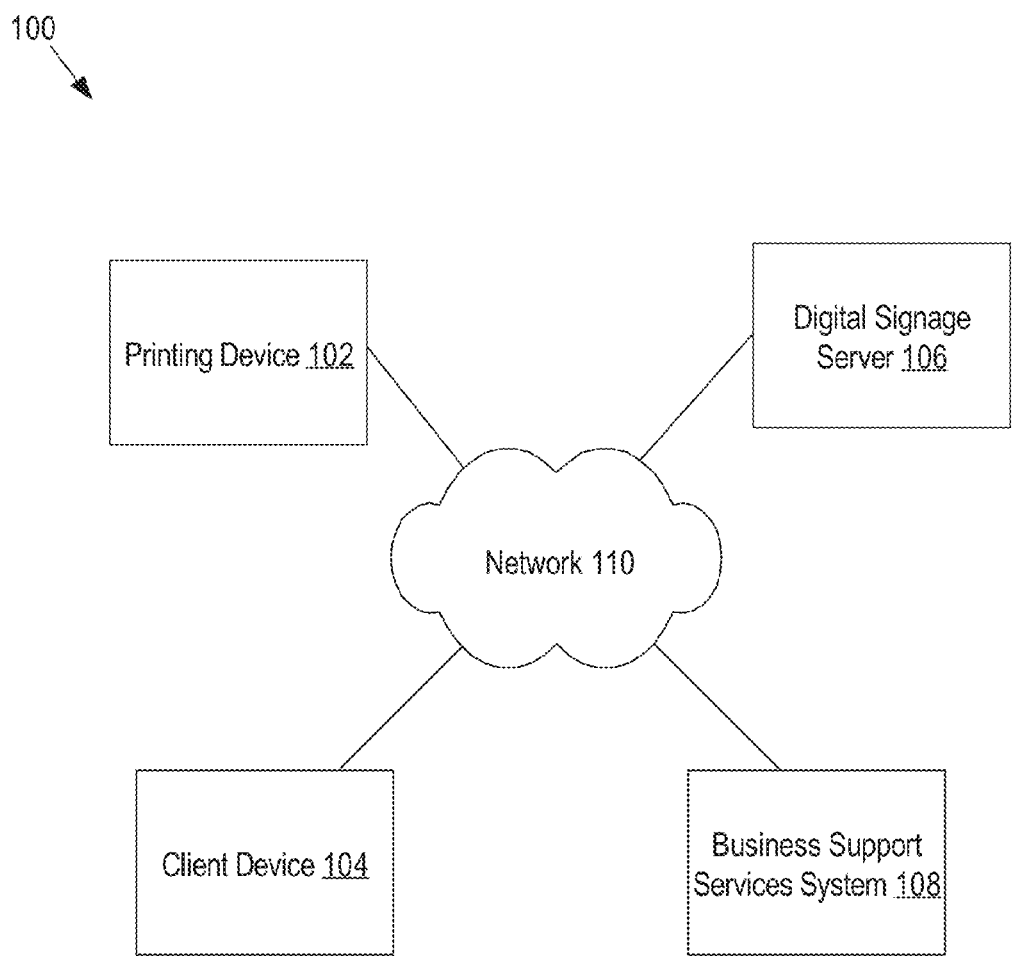
FIG. 1 is a block diagram that depicts an arrangement of a system for displaying digital signage items on printing devices.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
    II. System Architecture
        A. Printing Device
        B. Client Device
        C. Digital Signage Server
        D. Business Support Services System
    III. Displaying Digital Signage on a Printing Device
    IV. Interacting with Displayed Digital Signage Items
        A. Sending Digital Signage Item Messages
        B. Printing Coupons
        C. Displaying External Content
    V. Analyzing Logged Activity Data
    VI. Implementation Mechanisms I. Overview An approach is provided for displaying digital signage on a printing device. As used herein, the term "digital signage" generally refers to any type of visual display element or combination thereof that may be displayed on a digital display screen. Examples of visual display elements may include, without limitation, images, animations, videos, and text. In the context of printing devices, digital signage generally may be used to present advertisements, informational items, or other types of content that may be of interest to users of a printing device.

In an embodiment, a printing device sends a request to a digital signage server for digital signage items. The request includes a device identifier that identifies the printing device sending the request. The device identifier allows a digital signage server to select digital signage items that may be targeted for display on the particular printing device. For example, a digital signage server may select particular digital signage items based on stored information about the particular printing device including information about users of the printing device, a geographical location of the printing device, information about previous user interactions with displayed digital signage items, particular features of the printing device, etc., or any combination thereof. The printing device may receive the selected digital signage items and display the items for viewing by users of the printing device. For example, the printing device may display the received digital signage items on a display screen when the printing device enters a particular operational state (e.g., a "sleep mode") or in unused portions of a graphical user interface display.

In an embodiment, a printing device may also enable users to interact with displayed digital signage items, for example, by sending an email or other message including information about a displayed digital signage item, printing a coupon associated with a displayed digital signage item, or viewing a product website associated with a displayed digital signage item. The printing device may also monitor and log the occurrence of activities with respect to displayed digital signage items. For example, the activities may include actions of the printing device (e.g., receiving and displaying particular digital signage items) and user input actions (e.g., receiving user input to send a message, print a coupon, or display a product website). The logged activity data may be used for a variety of purposes including the calculation of advertising fees to be charged to digital signage item providers.

II. System Architecture

FIG. 1 is a block diagram that depicts an arrangement 100 of a system for displaying digital signage items on printing devices. The arrangement 100 includes a printing device 102, a client device 104, a digital signage server 106, and a business support services system 108 that are communicatively coupled via a network 110. Network 110 may be implemented using a wide variety of communications links that may vary depending upon a particular implementation. For example, network 110 may include one or more Local Area Networks (LANs), Wide Area Networks (WANs), packet-switched networks, such as the Internet, terrestrial or satellite links, or other types of wireless links. Printing device 102, client device 104, digital signage server 106, and business support services system 108 may be communicatively coupled via one or more direct communications links and may be co-located in the same physical location or located in physically-disparate locations, depending upon a particular implementation, and the approach described herein is not limited to these elements being in any particular physical location(s).

A. Printing Device

Printing device 102 may be implemented by any type of device that is capable of processing print jobs received from a client device 104 or other sources and to generate printed versions of electronic documents represented in the print jobs. Examples of printing device 102 include, without limitation, printers, copiers, and multi-function peripherals (MFPs).

Figure 2:
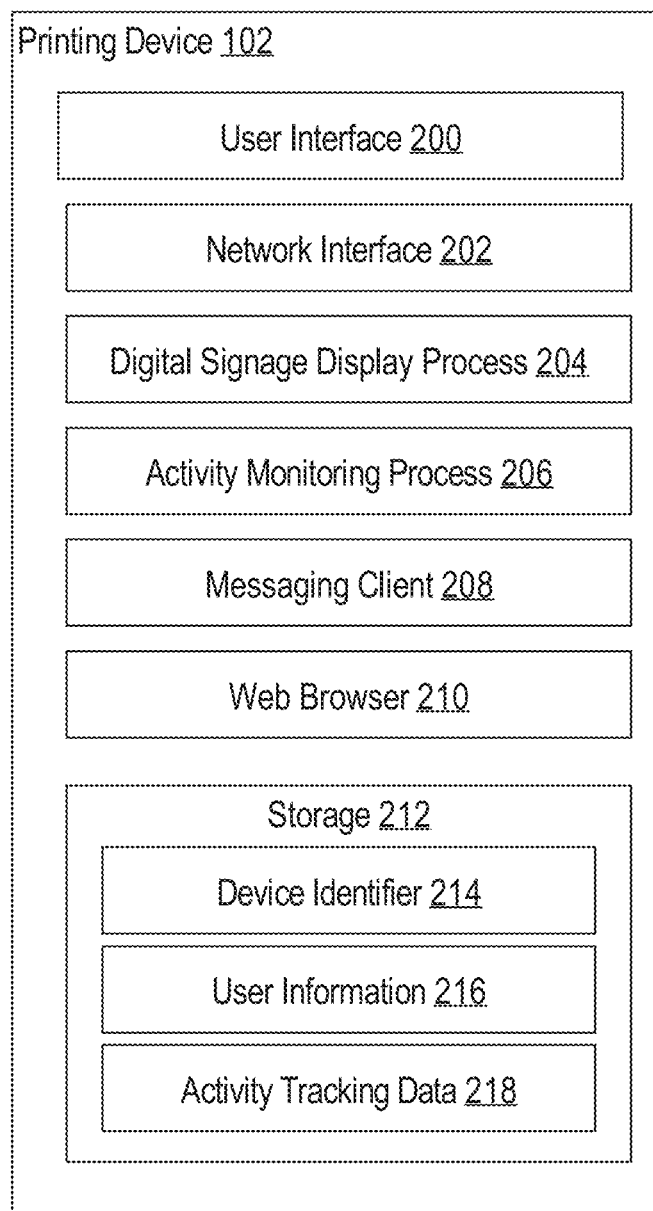
FIG. 2 is a block diagram that depicts an example printing device.

FIG. 2 is a block diagram that depicts an example printing device 102 according to one embodiment. The example printing device 102 includes a user interface 200, network interface 202, digital signage display process 204, activity monitoring process 206, messaging client 208, web browser 210, and storage 212. Printing device 102 may be configured with other mechanisms, modules, processes and functionality, depending upon a particular implementation. The approaches described herein for displaying digital signage on printing devices are not limited to printing devices having the specific elements depicted in FIG. 2 and may also have fewer elements than depicted in FIG. 2.

User interface 200 may be any type of user interface that is capable of displaying digital signage items on printing device 102 and may vary depending upon a particular implementation. Embodiments described herein are not limited to any particular type of user interface 200. Examples of user interface 200 may include a digital display screen, a keyboard and/or keypad, one or more control buttons, and any combination thereof. The digital display screen and other components may be a part of an operation panel that is generally configured to display information about the status of printing device 102 and to enable providing user input to control operation of printing device 102. In one embodiment, user interface 200 includes a display screen that is a touch screen capable of receiving touch input commands.

Figure 4:
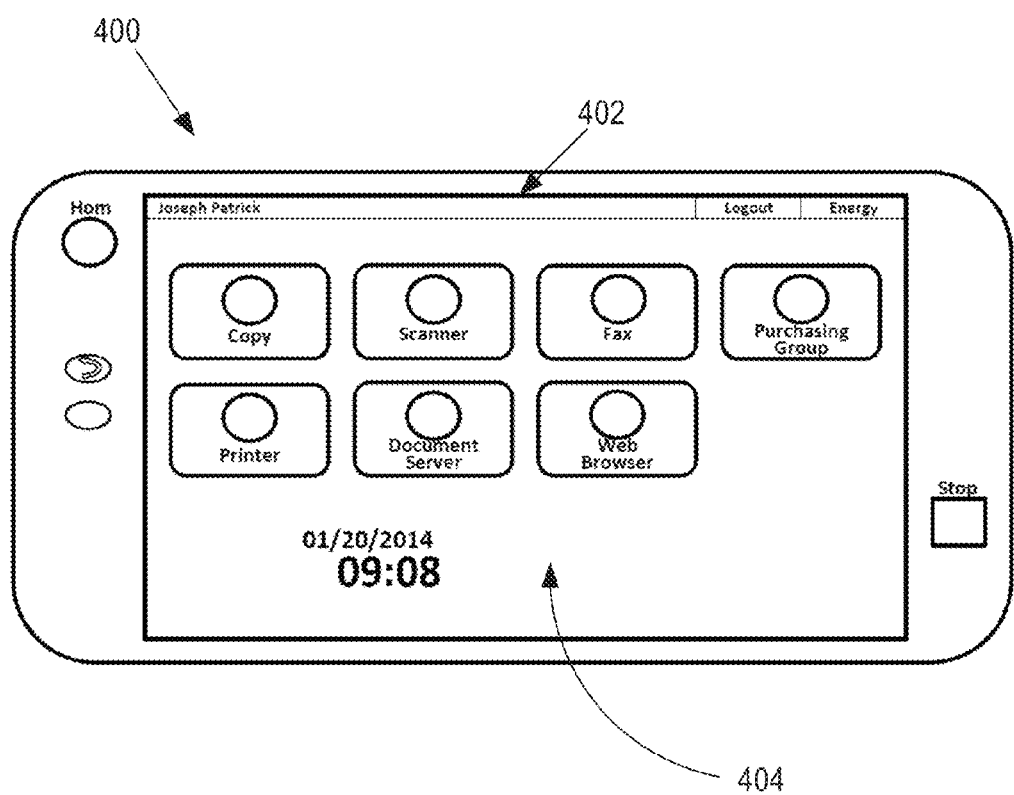
FIG. 4 depicts an example graphical user interface screen generated and displayed on an operation panel of a printing device.

FIG. 4 depicts an example graphical user interface screen generated and displayed on an operation panel of a printing device 102. In the example of FIG. 4, an operation panel 400 includes a digital display screen 402 displaying a graphical user interface (GUI) 404. In this example, GUI 404 includes several GUI objects or icons that correspond to various functionalities available on printing device 102, namely, copying, scanning, faxing, viewing a purchasing group website, printing, accessing a document server, and opening a web browser. Selection of a particular user interface object may cause the corresponding functionality to be invoked and/or cause the display of related user interface screens on GUI 404. In one embodiment, display screen 402 is a touch screen that enables users to provide touch input to select particular user interface objects by touching the display screen 402 at the display location of the user interface objects.

Referring again to FIG. 2, network interface 202 may be implemented by any mechanism that allows printing device 102 to communicate with a network. Examples of network interface 202 include, without limitation, a wired or wireless network interface card.

Digital signage display process 204 is configured to manage the retrieval, storage, and display of digital signage items on a printing device 102. For example, digital signage display process 204 may retrieve digital signage items from digital signage server 106 and store any retrieved digital signage items in storage 212. Digital signage display process 204 may display one or more retrieved digital signage item on a display screen of user interface 200. A digital signage item generally may include data associated with displaying the digital signage item (e.g., image files, videos, text) and any type of metadata that may be associated with the digital signage item. Examples of metadata that be stored as part of a digital signage item include, for example, an identifier of a company associated with the digital signage item, product descriptions, URLs for product websites, and product coupon information.

Figure 5:
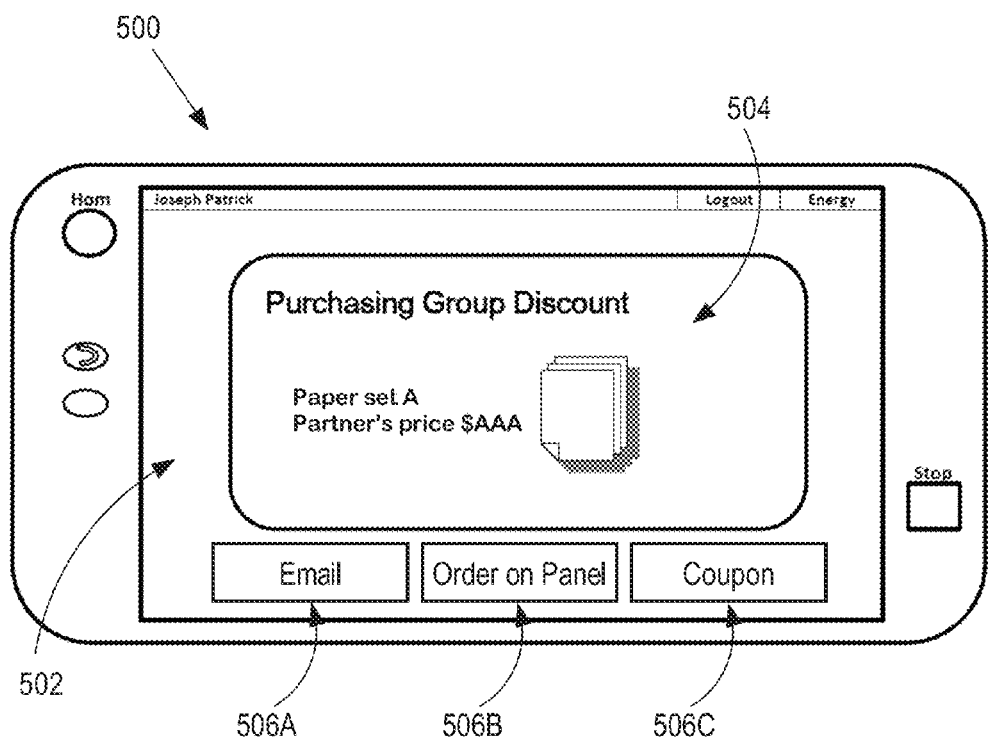
FIG. 5 depicts an example operation panel display screen displaying a digital signage item.

FIG. 5 depicts an example operation panel display screen displaying a digital signage item. In the example of FIG. 5, an operation panel 500 includes a graphical user interface (GUI) 502 displaying a digital signage item 504 and action buttons 506A-506C. GUI 502, for example, may be generated in response to detecting that printing device 102 is currently operating in a particular operational state, as described in more detail hereinafter. In this example, digital signage item 504 includes an image and text displayed in the center of GUI 502 representing an advertisement for paper supplies. Action buttons 506A-506C correspond to various functionality that may be invoked with respect to displayed digital signage item 504. For example, selection of action button 506A labeled "Email" may enable a user to send a message including information related to digital signage item 504. The processing of user input with respect to displayed digital signage items is described in more detail hereinafter.

Referring again to FIG. 2, activity monitoring process 206 of printing device 102 is configured to monitor and log activity related to the display of digital signage items and user interactions with displayed digital signage items. Examples of activity related to the display of digital signage items that may be monitored and logged by activity monitoring process 206 include a number of times each digital signage item is displayed at printing device 102, a duration of time each digital signage item is displayed, and specific times at which each digital signage item is displayed. Examples of user interactions that may be monitored and logged by activity monitoring process 206 include a user providing input to send a digital signage item message, print a digital signage item or associated coupon, or visit a website associated with a digital signage item on the printing device. Activity monitoring process 206 may store such monitored activities and user interactions as activity tracking data 218 in storage 212. In an embodiment, activity monitoring process 206 may periodically send logged activity tracking data 218 to digital signage server 106 for analysis.

Printing device 102 includes a messaging client 208 and web browser 210. Messaging client 208 generally is configured to enable printing device 102 to send and/or receive messages such as emails, instant messages, and SMS text messages. Examples of a messaging client 208 include, without limitation, an email client, an instant messaging client, SMS client, or combinations thereof. Web browser 210 may be any type of web browser that may vary depending upon a particular implementation.

Storage 212 may include any type of volatile or non-volatile storage including, without limitation, random access memory (RAM) and one or more disks. In the present example, storage 212 stores data including a device identifier 214, user information 216, activity tracking data 218, and other information. Device identifier 214 generally represents any value that can be used to identify printing device 102. User information 216 may include information about one or more users of printing device 102 including, for example, user account information, user email addresses, and other user preferences.

B. Client Device

Referring again to FIG. 1, client device 104 generally may be any type of computing device. Examples of a client device 104 include, without limitation, personal computers, laptop computers, tablet computers, personal digital assistants (PDAs), and smart phones. Client device 104 may be configured with computer hardware, computer software, or any combination of computer hardware and computer software to perform the functionality described herein.

For the purposes of explanation, one printing device 102 and one client device 104 are shown in FIG. 1, but embodiments may use any number of printing devices and client devices.

C. Digital Signage Server

Figure 3:
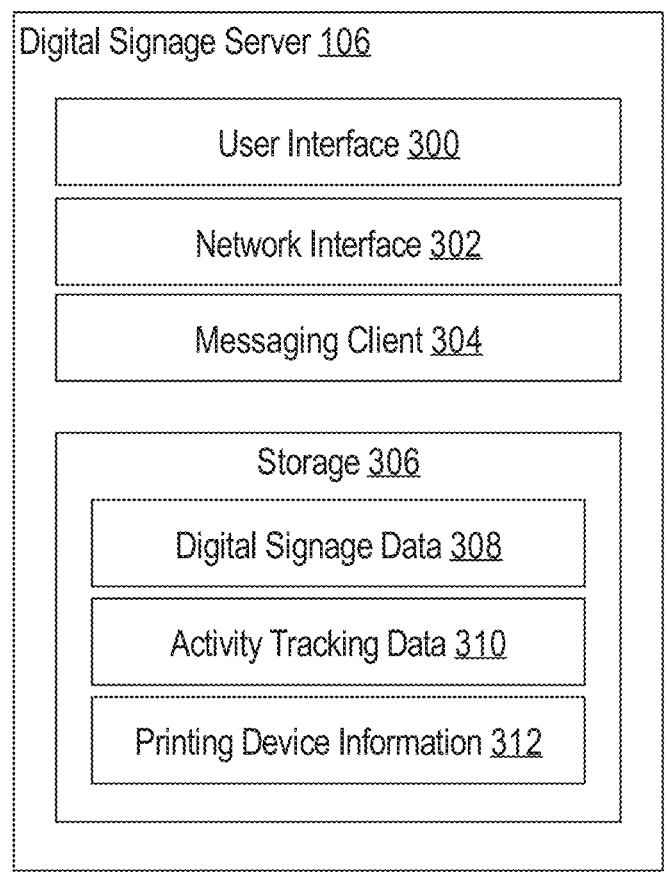
FIG. 3 is a block diagram that depicts an example digital signage server.

Digital signage server 106 may be implemented by hardware, computer software, or any combination of hardware and computer software for storing and managing digital signage items. FIG. 3 is a block diagram that depicts an example implementation of digital signage server 106 according to one embodiment. The example digital signage server 106 includes a user interface 300, network interface 302, messaging client 304, and storage 306. Digital signage server 106 may be configured with other mechanisms, modules, processes and functionality, depending upon a particular implementation. The approaches described herein for displaying digital signage on printing devices are not limited to a digital signage server having the specific elements depicted in FIG. 3 and may also have fewer elements than depicted in FIG. 3.

User interface 300 may be any type of user interface configured to enable users to manage digital signage items stored on digital signage server 106. In one embodiment, user interface 300 may be implemented as a web-based application providing one or more display screens that enable users to provide create and/or upload digital signage items and to manage existing digital signage items stored on digital signage server 106, view statistics about existing digital signage items, and manage user account information including payment of advertising fees. The management of digital signage items and calculation of advertising fees by digital signage server 106 is described in more detail hereinafter.

Network interface 302 may be implemented by any mechanism that allows digital signage server 106 to communicate with a network. Examples of network interface 302 include, without limitation, a wired or wireless network interface card. Messaging client 304 may be any type of application that enables digital signage server to send and/or receive messages, similar to messaging client 208 of printing device 102. In one embodiment, messaging client 304 may be configured to receive commands from a printing device 102 to send messages on behalf of the printing device.

Storage 306 includes digital signage data 308, activity tracking data 310, and printing device information 312. Digital signage data 308 stores any number of digital signage items capable of being displayed on a printing device 102, as well as metadata for the digital signage items, as described in more detail hereinafter. Digital signage data 308 may include digital signage items provided by users via user interface 300, as described above, and/or may include digital signage items preconfigured on digital signage server 106. Activity tracking data 310 may include activity tracking data received from printing devices, such as a printing device 102, and other usage data received from business support services system 108.

Printing device information 312 may include information about one or more printing devices, such as printing device 102. Printing device information 312 may include, for example, a mapping between device identifiers and device capabilities, a particular geographical location, etc. As another example, printing device information may include a mapping between a device identifier and a company a name, a business type, a number of employees, etc.

D. Business Support Services System

Referring again to FIG. 1, business support services system 108 may be implemented by hardware, computer software, or any combination of hardware and computer software for monitoring and managing use of one or more devices such as a printing device 102. In one embodiment, business support services system 108 represents one or more servers operated by an entity that owns or is otherwise responsible for printing device 102 and/or an office space at which a printing device 102 is located. For example, the entity may be a business support services provider that provides access to office space and equipment to customers on a rental basis and business support services system 108 may monitor office space and equipment usage for the purpose of charging customers for their use of the equipment. In this example, printing device 102 may be one of many devices managed by business support services system 108 across a possibly large number of office spaces.

An entity operating business support services system 108 may be further associated with one or more partner organizations, for example, companies representing a purchasing group. In one embodiment, digital signage items stored on digital signage server 106 may be provided in part from such partner organizations in the form of advertising or other content related to products and services of the partner organizations. In turn, the entity operating business support services system 108 may desire to charge the partner organizations advertising fees based on the display of the digital signage items provided by the partner organizations. In order to facilitate this exchange, business support services system 108 may be configured to communicate with one or more partner organization systems (not displayed) to enable the partner organizations to provide digital signage items for distribution by digital signage server 106 and to enable the business services provider to charge partner organizations for display of digital signage items. The calculation of fees for the display of digital signage items is described in more detail hereinafter.

III. Displaying Digital Signage on a Printing Device

According to embodiments described herein, printing device 102 requests and receives digital signage items from a digital signage server 106, displays received digital signage items at the printing device 102, and processes user input with respect to displayed digital signage items. In response to a request for digital signage items from a printing device 102, digital signage server 106 selects digital signage items that may be targeted for the particular environment in which the printing device 102 is operating and/or for particular users of the device.

Figure 6:
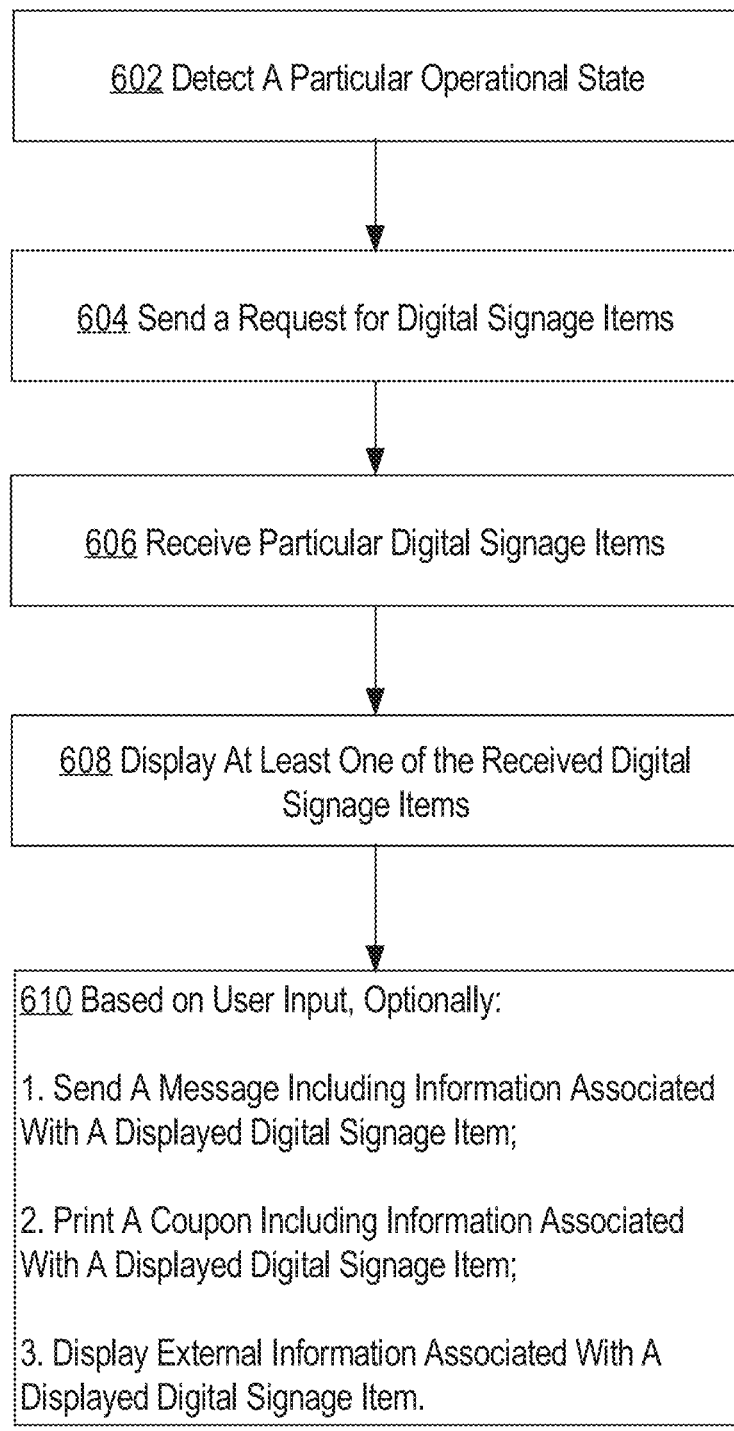
FIG. 6 a flow diagram that depicts an approach for displaying digital signage items on a printing device.

FIG. 6 is a flow diagram 600 that depicts an approach for displaying digital signage at a printing device, according to an embodiment. Although embodiment are described hereinafter in the context of displaying digital signage items on printing device 102 when printing device 102 is in a particular operational state, embodiments are not limited to this context and a particular operational state is not a prerequisite for displaying digital signage items on printing device 102. In step 602, a digital signage display process 204 of a printing device 102 determines that printing device 102 is in a particular operational state. In this context, an operational state generally refers to a set of subsystems and/or services of printing device 102 that are active on the printing device at a particular time. For example, when printing device 102 is not currently processing any print jobs or receiving user input, the printing device may be configured to operate in an operational state in which the printing device consumes less power, typically by shutting down one or more subsystems or services. This operational state may be referred to as a "sleep" or "energy saving" mode. As another example, a printing device 102 may be configured to operate in an active operational state in response to receiving a print job or user input at an operation panel. Any number of different operational states may be defined for a particular printing device 102 depending on the types of functionality that are needed to perform particular functions. In an embodiment, digital signage display process 204 may detect that printing device 102 is in a particular operational state in response to detecting that printing device 102 has changed from one operational state to another, or by periodically checking the current operational state to determine if printing device 102 is in a particular operational state.

In step 604, digital signage display process 204 sends a request to a digital signage server 106 for digital signage items. Although digital signage display process 204 is shown sending a request for digital signage items in step 604 following detection of the printing device 102 operating in a particular operational state in step 602, digital signage display process 204 may send the request for digital signage items at any time. For example, digital signage display process 204 may send the request for digital signage items upon powering on of printing device 102, on a periodic schedule, or in response to user input requesting retrieval of digital signage items. In one embodiment, digital signage display process 204 may determine whether printing device 102 currently has stored digital signage items suitable for display and may send the request only if it is determined that printing device 102 does not currently have stored any such digital signage items.

In an embodiment, a request sent by digital signage display process 204 for digital signage items includes a device identifier identifying the printing device 102. In response to receiving the request, digital signage server 106 may select particular digital signage items based on the device identifier. For example, digital signage server 106 may store printing device information 312 that maps device identifiers to device characteristics that enable digital signage server 106 to select digital signage items that may be targeted for a particular printing device. Examples of device characteristics that may be stored by a digital signage server 106 for a particular printing device include, without limitation, information about the users of the printing device and/or the current tenants of the office space in which the printing device is located, a geographic location of the printing device, a type of office space in which the printing device is located, a type of operation panel installed on the device, printing device capabilities, etc., or any combination thereof. As one non-limiting example of digital signage server 106 selecting particular digital signage items, in response to determining that a requesting printing device 102 is located in a particular geographic location and in an office space whose current tenants frequently travel, digital signage items for airlines that operate in the particular geographic location may be selected for sending to printing device 102 for display.

In step 606, digital signage display process 204 receives one or more particular digital signage items from digital signage server 106. Digital signage display process 204 may store the received digital signage items in storage 212 for subsequent retrieval and display. The digital signage items may be included as part of digital signage data received from digital signage server 106 and may include one or more digital signage items and metadata for the one or more digital signage items. The metadata for the one or more digital signage items may include, for example, information about the one or more digital signage items, links to Websites associated with the digital signage items, as well as information about where and when on printing device 102 the one or more digital signage items are to be displayed. This may include, for example, conditions under which the display of the one or more digital signage items is to be initiated and terminated and one or more locations on printing device 102 where the one or more digital signage items are to be displayed.

In step 608, digital signage display process 204 displays at least one of the one or more particular digital signage items received from digital signage server 106. For example, a digital signage item may be displayed on a user interface 200 of the printing device 102, as depicted in one example above in FIG. 5. The display screen including the digital signage item may be displayed in response to detecting that the printing device 102 has transitioned into a particular operational state from a plurality of operational states. For example, the operational state may be a "low power" operational state and the display screen may be part of a "screensaver" or other similar display. As another example, the display screen generally may be any other interface generated by printing device 102 and the digital signage item may be displayed in an unused region of the interface.

Displaying a digital signage item generally may include displaying any images, animations, videos, text, or combinations thereof that are associated with the digital signage item on a display screen of printing device 102. For example, a digital signage item representing a product advertisement may include an image depicting the product along with text providing a product description. Digital signage display process 204 may cause a particular digital signage item to be displayed for any length of time and may display multiple digital signage items in a sequence (e.g., as a slideshow)

and/or display multiple digital signage items simultaneously on different regions of the display screen.

In one embodiment, displaying a digital signage item may include displaying the digital signage item according to one or more display parameters received for the digital signage item. For example, the display parameters may be included as metadata received with the digital signage item from digital signage server 106. Examples of display parameters received for a particular digital signage item may include information such as a size at which to display one or more graphical elements, a duration of time to display one or more graphical elements, color information for displaying elements of the digital signage item, information indicating whether graphical elements are animated, etc. Digital signage display process 204 may parse metadata associated with a digital signage item to be displayed and control the display on printing device 102 according to any provided parameters.

IV. Interacting with Displayed Digital Signage Items

The approaches described herein for displaying digital signage items at printing devices provide user interfaces that allow users to interact with displayed digital signage items. In step 610 of FIG. 6, based on user input received selecting a particular action related to a currently displayed digital signage item, printing device 102 may perform the selected action. For example, as depicted in FIG. 5, one or more interface elements may be displayed on a graphical user interface of a printing device 102 in conjunction with a displayed digital signage item that, upon selection by a user, may cause the printing device 102 to perform the selected action. Examples of actions that may be performed include, without limitation, sending a message containing information about the displayed digital signage item to another device, printing information about the digital signage item such as a coupon, displaying a webpage associated with the digital signage item, and other functionality described hereinafter.

A. Sending Digital Signage Item Messages

According to an embodiment, user input may be received that causes printing device 102 to send to another device (e.g., a client device 104) a message that includes information associated with a displayed digital signage item. For example, a user viewing a digital signage item displayed at printing device 102 may desire the ability to review information related to the digital signage item on another device, for example, on the user's desktop computer or a mobile device. The digital signage item may be an advertisement for a particular product, for example, and the user may desire to review the additional information about the product at a later time and at a more convenient device for viewing such information. As another example, the user may desire to share the digital signage item with another user that may be more particularly interested in the advertised product. To send a digital signage item message, in one embodiment, a user may provide input selecting a particular interface element of user interface 200 (e.g., an "Email" button 506A as depicted in FIG. 5) during display of a digital signage item and, in response, messaging client 208 may send the message.

Examples of types of messages that printing device 102 may send in response to a user's request include emails, instant messages, text messages, or any other type of electronic message. The content of the message generally may include any type of information related to the digital signage item such as images, links to websites associated with the digital signage item, and coupon codes or other product ordering information. The content of the message for a particular digital signage item may be included as metadata stored in association with the digital signage item. For example, a digital signage item advertising a particular product may include metadata specifying information to be included in messages generated by a printing device 102 for the digital signage item including a product description, a URL for the company's website or a web-based order form, and coupon codes associated with particular promotions or discounts.

Receiving user input to send a digital signage item message may include selecting a recipient address for the message. Printing device 102 may select a recipient address without a user directly specifying the recipient address. For example, a printing device 102 may store user information 216 that includes a default recipient address for sending messages. The default recipient address may be configured by an administrator or other user of the printing device 102. Printing device 102 may select the default recipient address for messages unless other user input is provided selecting a different recipient address. As another example, user information 216 may store separate recipient addresses for individual user accounts and printing device 102 may select a recipient address based on a user currently logged into printing device 102. As yet another example, a user may provide a selection of a recipient address by selecting a recipient address from a list of stored recipient addresses, or by providing a new recipient address using user interface 200.

Printing device 102 may send a message to a selected recipient address using a messaging client 208 installed at printing device 102, or by sending a command to another device to send the message on behalf of printing device 102. For example, if printing device 102 does not have a suitable messaging client installed, printing device 102 may send a command to digital signage server 106 instructing the digital signage server to send the message. The command sent to digital signage server 106 may include information about the content of the message and a recipient address. Alternatively, the command may include a device identifier and digital signage item identifier and digital signage server 106 may use the device identifier and digital signage item identifier to retrieve the recipient information and message content from storage 306 and generate and transmit the message.

B. Printing Coupons

According to an embodiment, user input may be received that causes printing device 102 to generate a printout that includes information associated with a displayed digital signage item, such as a copy of a displayed advertisement or a coupon for products or services advertised by the digital signage item. For example, if a displayed digital signage item relates to an advertisement for paper products, a printout generated by printing device 102 may include a coupon which a user may redeem at a point of purchase to obtain an associated discount. A coupon associated with a digital signage item may also be sent to another device by printing device 102 in a message such as an email, as described above. In an embodiment, a user may provide input selecting a particular interface element of user interface 200 (e.g., a "Coupon" button 506C as depicted in FIG. 5) to cause printing device 102 to generate a digital signage item printout.

Similar to the content of digital signage item messages described above, the contents of a printout generated by a printing device 102 for a particular digital signage item may be based in part on metadata stored in association with the digital signage item. For example, the metadata may specify one or more images, product information, or other data to be included on a printout.

In an embodiment, a coupon or other printout generated by a printing device 102 may include information, such as a user identifier, that identifies a user of printing device 102. The user identifier may include the actual name of a user, a code and/or symbol that corresponds to the user, or both the actual name of the user and a code and/or symbol that correspond to the user, depending upon a particular implementation. A user identifier included on a coupon may be useful when the user redeems the coupon at a point of purchase. For example, the user identifier may be used by a point of purchase system to identify billing or other information for the user redeeming the coupon. As another example, in response to a user generating a coupon printout for a digital signage item, printing device 102 or digital signage server 106 can send information to a company associated with the digital signage item indicating that the coupon was issued to the particular user so that the company may track whether or not the coupon is ever redeemed.

C. Displaying External Content

According an embodiment, user input may be received that causes printing device 102 to display a website or other external information associated with a displayed digital signage item in a web browser. For example, a user viewing a digital signage item displayed at printing device 102 may desire to view a website containing additional information about an advertised product, or to view a product order form so that the user may place an order for advertised products. To display external information about a digital signage item, a user may provide input selecting a particular interface element of user interface 200 (e.g., an "Order on Panel" button 506B as depicted in FIG. 5) indicating a desire to view the external information and, in response to the user input, printing device 102 may cause a web browser 210 to display the external information. As another example, a user may directly select a particular digital signage item via user interface 200 by manually touching the particular digital signage item displayed on user interface 200. In response to the direct selection of the particular digital signage item, Web browser 210 requests and displays one or more Web pages that correspond to the particular digital signage item. One or more uniform resource locators (URLs) for the one or more Web pages may be included in the digital signage data for the one or more digital signage items.

As described above, examples of external information that may be displayed in response to user input may include a company website providing additional information about an advertised product, or a website providing a form for ordering the advertised products. The links to the associated websites for a particular digital signage item may be included in metadata stored with the digital signage item. In one embodiment, if the external information includes a product order form, printing device 102 may populate the order form with information stored on the printing device 102 that may facilitate the ordering process for the user. For example, the populated information may include information identifying the user, billing information for the user, and coupon information for obtaining a particular discount. By populating elements of a displayed order form for the user, the user may place an order for the advertised products directly from the printing device 102 with greater ease.

V. Analyzing Logged Activity Data

In addition to displaying digital signage items, a printing device 102 may be configured to monitor and log the occurrence of various activities related to the displaying of digital signage items and other user input actions. Examples of logged activities may include operating activities of printing device 102 (e.g., retrieving digital display items, displaying particular digital display items, and changing operational states) and user input activities (e.g., receiving user input to send a message, print a coupon, or display a product website). The logged activity tracking data may be stored on printing device 102 and sent to digital signage server 106 for analysis. Digital signage server 106 may analyze activity tracking data received from a printing device 102 for a variety of purposes such as measuring effectiveness of digital signage items based on user responses, and calculating fees to charge to advertisers for the display of digital signage items.

Figure 7:
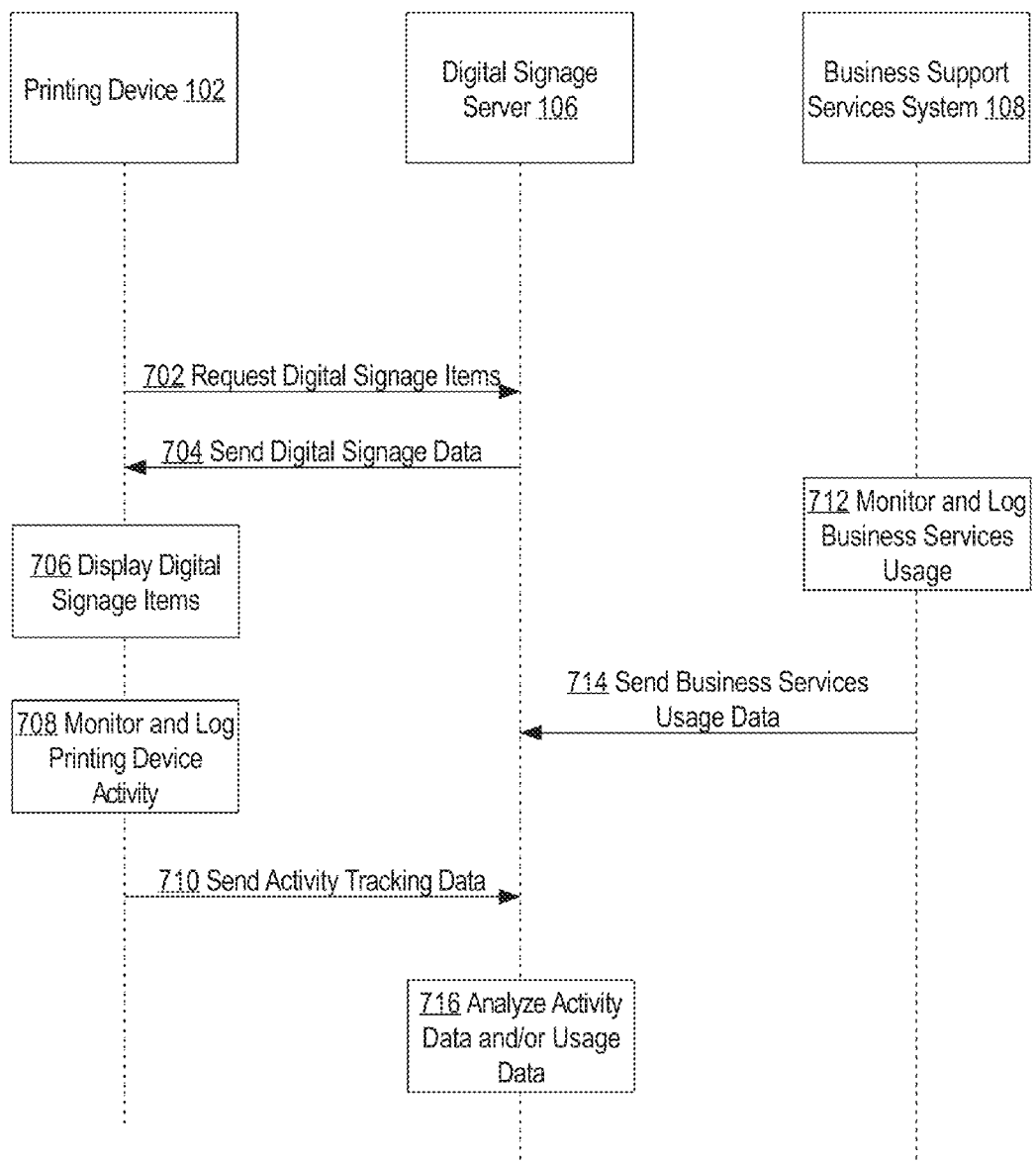
FIG. 7 is a sequence diagram that depicts an exchange of messages in an approach for analyzing activity tracking data in a system for displaying digital signage items.

FIG. 7 is a sequence diagram that depicts an exchange of messages and other information in an approach for analyzing activity tracking data in a system for displaying digital signage items at printing devices. In step 702, a printing device 102 generates and sends to digital signage server 106 a request for digital signage items. The digital signage server 106 processes the request by selecting one or more particular digital signage items, and sends particular digital signage data that includes the one or more particular digital signage items to the printing device 102 in step 704. In step 706, the printing device displays at least one of the digital signage items received from digital signage server 106. Printing device 102 displaying digital signage items received from digital signage server 704 generally may be performed in a similar manner as previously described herein with respect to steps 604-608 in FIG. 6.

In step 708, printing device 102 monitors and logs various types of activity occurring at printing device 102. Examples of activity tracking data that may be collected by printing device 102 include information about which digital signage items printing device 102 has received from digital signage server 106, a number of times each received digital signage item is displayed, a duration of time each digital signage item is displayed, and specific times of day at which each digital signage item is displayed. Activity tracking data collected by printing device 102 may also include user activity at printing device 102 including, without limitation, a user sending a digital signage item message, printing a digital signage item or associated coupon, and viewing a website or other external information associated with a digital signage item. Printing device 102 may log and store the data as activity tracking data 218 in any suitable format depending on a particular implementation.

In step 710, printing device 102 sends activity tracking data to digital signage server 106. Printing device 102 may send the activity tracking data to digital signage server 106 at any time after the data is collected. For example, the printing device 102 may send the activity tracking data as the activities occur, or printing device 102 may collect and store activity tracking data and send the stored activity tracking data to digital signage server 106 periodically.

In step 712, business support services system 108 monitors and logs usage information related to the use of printing device 102 and other devices associated with printing device 102. For example, the other devices may include devices co-located with printing device 102 at a rental office space that is managed by an entity operating business support services system 108. Examples of usage information that may collected by business support services system 108 include, without limitation, use of printing device 102 (e.g., printing, faxing, copying) and other associated devices and information about when one or more persons are present in the office space containing printing device 102 (e.g., based on keycard entry or other monitoring tools). Some of the information collected by business support services system 108 in step 714 may be the same or similar to activity tracking data collected by printing device 102 in step 710. In step 714, business support services system 108 sends collected business services usage data to digital signage server 106. It is noted that steps 712-714 performed by business support services system 108 generally may be performed at any time relative to the steps 702-710 performed by printing device 102.

In step 716, digital signage server 106 analyzes activity tracking data received from printing device 102 and/or usage data received from business support services system 108. As described above, digital signage server 106 may analyze received tracking and usage data to generate statistics about the display and user interaction with digital signage items and to calculate advertisement fees to charge providers of digital signage items. For example, providers of digital signage items may be charged for the display of digital signage items based on any number of different metrics including a number of times each provided digital signage item is displayed, a duration of time each digital signage item is displayed, a number of times a user interacts with a displayed digital signage item, etc. Digital signage server 106 may analyze the data on a periodic basis or may analyze the data in response to a user request. In one embodiment, digital signage server 106 or business support services system 108 may provide a web application that allows partner organizations to log in and view statistical and advertising fee information for digital signage items provided by the partner organization.

In one embodiment, calculating advertising fees for the display of digital signage items may include digital signage server 106 analyzing both activity tracking data received from printing device 102 and usage data received from business support services system 108. For example, digital signage server 106 may calculate a charge for the display of a particular digital signage item on a printing device 102 only if it is determined that a user was present or active in an office space containing printing device 102 at the time the digital signage item was displayed. For example, it may be determined that a user was present in the office space at the time the digital signage item was displayed by correlating activity tracking data received from printing device 102, indicating a time at which the digital signage item was displayed, with usage data received from business support services system 108, indicating times users were present and/or active in the office space containing printing device 102.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
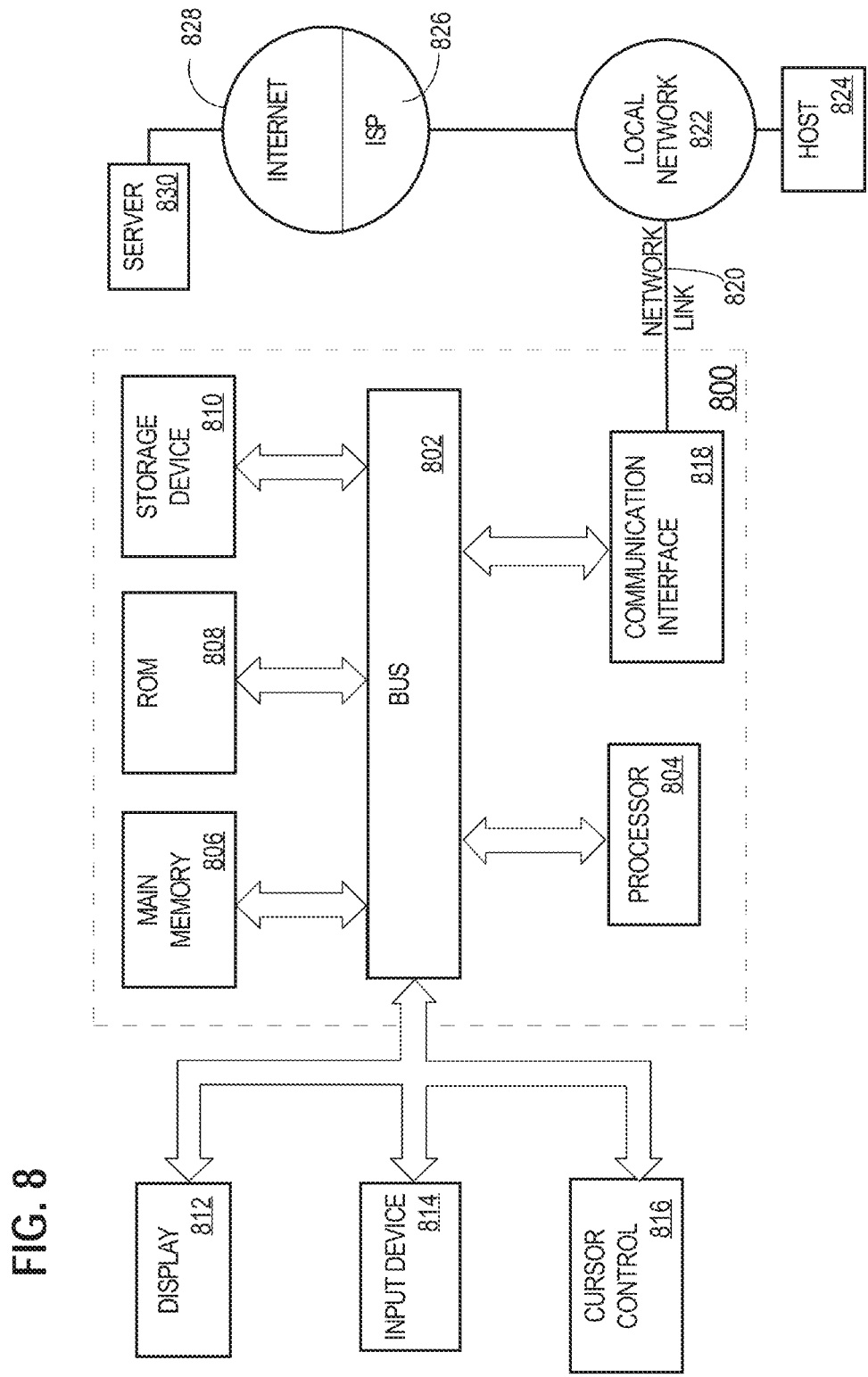
FIG. 8 is a block diagram that depicts an example computer system upon which an embodiment may be implemented.

FIG. 8 is a block diagram that depicts an example computer system 800 upon which embodiments may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. Although bus 802 is depicted as a single bus, bus 802 may comprise one or more buses. For example, bus 802 may include without limitation a control bus by which processor 804 controls other devices within computer system 800, an address bus by which processor 804 specifies memory locations of instructions for execution, or any other type of bus for transferring data or signals between components of computer system 800.

An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic or computer software which, in combination with the computer system, causes or programs computer system 800 to be a special-purpose machine. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 800, various computer-readable media are involved, for example, in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
    one or more processors;
    a user interface configured to receive user input and display information;
    one or more memories storing instructions which, when processed by the one or more processors, cause:
        sending, to a digital signage server, a request for one or more digital signage items to be displayed on the printing device, wherein the request includes a device identifier;
        receiving, from the digital signage server, particular digital signage data for one or more particular digital signage items to be displayed on the printing device;
        displaying, on the user interface, based at least in part on the particular digital signage data for the one or more particular digital signage items to be displayed on the printing device, at least one particular digital signage item from the one more particular digital signage items;
        receiving user input at the printing device requesting to send a message including information associated with a digital signage item, and
        in response receiving the input requesting to send the message, sending the message to a recipient address associated with a user of the printing device.

2. The printing device of claim 1, wherein sending, to the digital signage server, the request for digital signage items causes the digital signage server to select the one or more particular digital signage items based at least in part on the device identifier.

3. The printing device of claim 1, the memory further comprising instructions which, when processed by the one or more processors, cause:
    detecting that the printing device is currently operating in one or more particular operational states from a plurality of operational states;
    wherein the at least one of the one or more particular digital signage items is displayed subsequent to the detecting that the printing device is currently operating in one or more particular operational states from a plurality of operational states.

4. The printing device of claim 1, the memory further comprising instructions which, when processed by the one or more processors, cause:
    receiving user input at the printing device to print a coupon associated with a displayed digital signage item;
    in response to receiving the input to print a coupon associated with the displayed digital signage item, printing a coupon associated with the displayed digital signage item, wherein the coupon includes a user identifier.

5. The printing device of claim 1, the memory further comprising instructions which, when processed by the one or more processors, cause:
    receiving user input at the printing device to display a website for one or more products associated with a displayed digital signage item;
    in response to receiving the user input to display the website, causing displaying of a webpage associated with the digital signage item.

6. The printing device of claim 5, wherein causing displaying of the webpage associated with the digital signage item includes displaying a product order form.

7. The printing device of claim 1, the memory further comprising instructions which, when processed by the one or more processors, cause:
    recording one or more user input actions received by the printing device;
    sending the recorded one or more input actions to the digital signage server.

8. The printing device of claim 7, wherein the one or more user input actions include one or more of providing input to send a message, providing input to display a website, providing input to print a coupon.

9. A printing device comprising:
one or more processors;
a user interface configured to receive user input and display information;
one or more memories storing instructions which, when processed by the one or more processors, cause:
sending, to a digital signage server, a request for one or more digital signage items to be displayed on the printing device, wherein the request includes a device identifier;
receiving, from the digital signage server, particular digital signage data for one or more particular digital signage items to be displayed on the printing device;
displaying, on the user interface, based at least in part on the particular digital signage data for the one or more particular digital signage items to be displayed on the printing device, at least one particular digital signage item from the one more particular digital signage items;
receiving user input at the printing device requesting to send a message including information associated with a digital signage item, and
in response receiving the input requesting to send the message, sending a command to the digital signage server, wherein sending the command to the digital signage server causes the digital signage server to send the message to a recipient address associated with the printing device.

10. One or more non-transitory computer-readable storage media storing instructions which, when processed by one or more processors, cause:
sending, to a digital signage server, a request for one or more digital signage items to be displayed on a printing device, wherein the request includes a device identifier;
receiving, from the digital signage server, particular digital signage data for one or more particular digital signage items to be displayed on the printing device;
displaying, on a user interface, based at least in part on the particular digital signage data for the one or more particular digital signage items to be displayed on the printing device, at least one particular digital signage item from the one more particular digital signage items;
receiving user input at the printing device requesting to send a message including information associated with a digital signage item, and
in response receiving the input requesting to send the message, sending the message to a recipient address associated with a user of the printing device.

11. The one or more non-transitory computer-readable storage media of claim 10, wherein sending, to the digital signage server, the request for digital signage items causes the digital signage server to select the one or more particular digital signage items based at least in part on the device identifier.

12. The one or more non-transitory computer-readable storage media of claim 10, further comprising additional instructions which, when processed by the one or more processors, cause:
detecting that the printing device is currently operating in one or more particular operational states from a plurality of operational states;
wherein the at least one of the one or more particular digital signage items is displayed subsequent to the detecting that the printing device is currently operating in one or more particular operational states from a plurality of operational states.

13. The one or more non-transitory computer-readable storage media of claim 10, further comprising additional instructions which, when processed by the one or more processors, cause:
receiving user input at the printing device to print a coupon associated with a displayed digital signage item;
in response to receiving the input to print a coupon associated with the displayed digital signage item, printing a coupon associated with the displayed digital signage item, wherein the coupon includes a user identifier.

14. The one or more non-transitory computer-readable storage media of claim 10, further comprising additional instructions which, when processed by the one or more processors, cause:
receiving user input at the printing device to display a website for one or more products associated with a displayed digital signage item;
in response to receiving the user input to display the website, causing displaying of a webpage associated with the digital signage item.

15. The one or more non-transitory computer-readable storage media of claim 14, wherein causing displaying of the webpage associated with the digital signage item includes displaying a product order form.

16. The one or more non-transitory computer-readable storage media of claim 10 further comprising additional instructions which, when processed by the one or more processors, cause:
recording one or more user input actions received by the printing device;
sending the recorded one or more input actions to the digital signage server.

17. The one or more non-transitory computer-readable storage media of claim 16, wherein the one or more user input actions include one or more of providing input to send a message, providing input to display a website, providing input to print a coupon.

18. One or more non-transitory computer-readable storage media storing instructions which, when processed by one or more processors, cause:
sending, to a digital signage server, a request for one or more digital signage items to be displayed on a printing device, wherein the request includes a device identifier;
receiving, from the digital signage server, particular digital signage data for one or more particular digital signage items to be displayed on the printing device;
displaying, on a user interface, based at least in part on the particular digital signage data for the one or more particular digital signage items to be displayed on the printing device, at least one particular digital signage item from the one more particular digital signage items;
receiving user input at the printing device requesting to send a message including information associated with a digital signage item, and
in response receiving the input requesting to send the message, sending a command to the digital signage server, wherein sending the command to the digital signage server causes the digital signage server to send the message to a recipient address associated with the printing device.

\* \* \* \* \*